(12) United States Patent
Talan

(10) Patent No.: US 8,522,526 B2
(45) Date of Patent: Sep. 3, 2013

(54) TWO-SHAFT ENGINE FOR AIRCRAFT WITH HIGH ELECTRIC POWER DEMAND

(75) Inventor: Metin Talan, Berlin (DE)

(73) Assignee: Rolls-Royce Deutschland Ltd & Co. (DE)

( * ) Notice: Subject to any disclaimer, the term of this patent is extended or adjusted under 35 U.S.C. 154(b) by 1184 days.

(21) Appl. No.: 11/806,544

(22) Filed: Jun. 1, 2007

(65) Prior Publication Data

US 2007/0277532 A1 Dec. 6, 2007

(30) Foreign Application Priority Data

Jun. 2, 2006 (DE) .......................... 10 2006 026 287

(51) Int. Cl.
*F02C 7/36* (2006.01)
*F02K 3/04* (2006.01)

(52) U.S. Cl.
USPC ............. 60/204; 60/39.163; 60/802; 310/103

(58) Field of Classification Search
USPC ........... 60/36.163, 802, 226.1, 204; 310/105, 310/103
See application file for complete search history.

(56) References Cited

U.S. PATENT DOCUMENTS

| 4,220,057 A | 9/1980 | Krongard |
| 4,494,372 A | 1/1985 | Cronin |
| 5,201,796 A | 4/1993 | Glinski |
| 6,405,701 B1 * | 6/2002 | Masberg et al. ........... 123/192.1 |
| 7,481,062 B2 * | 1/2009 | Gaines et al. .................... 60/802 |
| 7,698,884 B2 * | 4/2010 | Maguire et al. ............ 60/39.163 |
| 7,788,898 B2 * | 9/2010 | Kern et al. .................. 60/39.163 |
| 2002/0189231 A1 * | 12/2002 | Franchet et al. ............. 60/226.1 |
| 2006/0272313 A1 * | 12/2006 | Eick et al. ..................... 60/39.63 |
| 2007/0137219 A1 * | 6/2007 | Linet et al. ....................... 60/802 |
| 2008/0136189 A1 * | 6/2008 | Qu et al. .......................... 290/52 |

FOREIGN PATENT DOCUMENTS

| DE | 2451741 | 5/1976 |
| DE | 2655868 | 6/1978 |
| DE | 692 04 196 T2 | 1/1996 |
| DE | 10 2004 023098 | 12/2005 |
| EP | 1519018 | 3/2005 |
| EP | 1617053 | 1/2006 |
| WO | 95/02120 | 1/1995 |

OTHER PUBLICATIONS

European Search Report dated Oct. 19, 2007 from counterpart application, Only the English portion of the search report has been considered.

\* cited by examiner

*Primary Examiner* — Ted Kim
(74) *Attorney, Agent, or Firm* — Timothy J. Klima; Shuttleworth & Ingersoll, PLC

(57) ABSTRACT

With an engine for aircraft with high electric power demand, the power of the low-pressure shaft (7) operating in a lower speed range is transmitted to the high-pressure shaft (6) by an electromagnetic clutch (10). In the clutch element (14) on the side of the low-pressure shaft a frequency-controllable rotary field is generated, which drives a magnet (13) connected to the high-pressure shaft.

14 Claims, 1 Drawing Sheet

TWO-SHAFT ENGINE FOR AIRCRAFT WITH HIGH ELECTRIC POWER DEMAND

Figure 1:
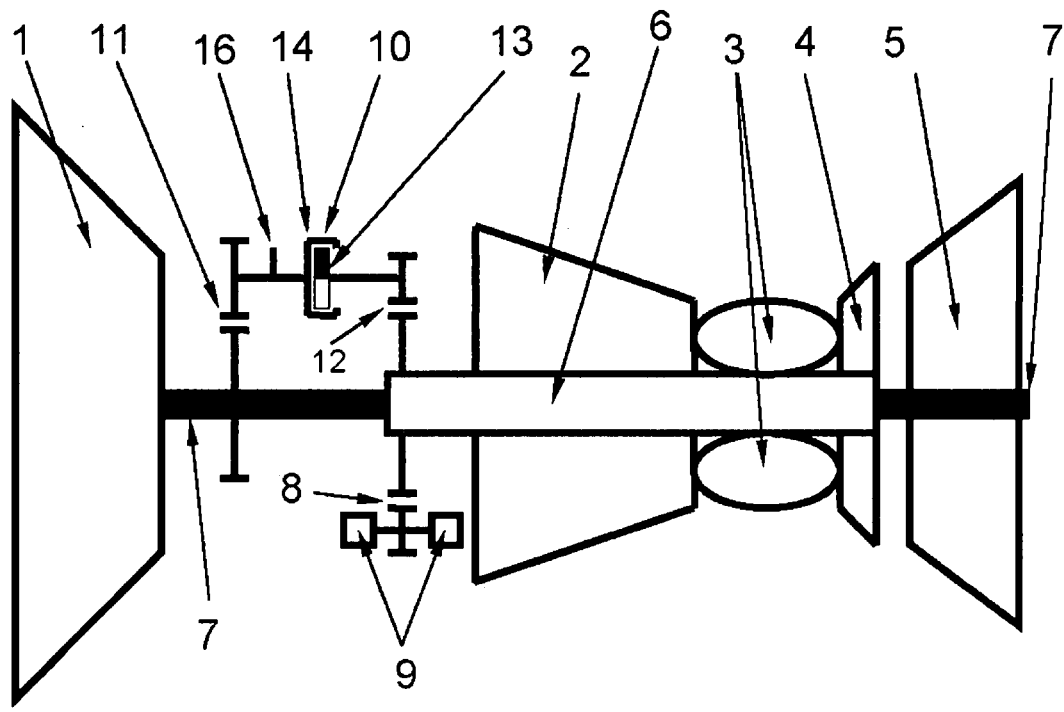

This application claims priority to German Patent Application DE 102006026287.5 filed Jun. 2, 2006, the entirety of which is incorporated by reference herein.

This invention relates to two-shaft engines for aircraft with high electric power demand which comprise a high-pressure shaft connected to generators, a low-pressure shaft and an electronic engine control system.

The electric power demand of aircraft is continually increasing since many systems are converted to electrical operation. Where an aircraft with high electric power demand (multiple electrical applications) is equipped with two-shaft engines, the power reserve capacity of the high-pressure shaft at engine idle (low speed) is, however, not sufficient to cover such increased power demand of the aircraft. Use of the low-pressure shaft of the engine, which has high capacity reserves even at idle, as a source for the generation of additionally required electric power by power transmission from the low-pressure shaft to the high-pressure shaft or the generators, respectively, is, however, problematic in that the ratio between the maximum and the minimum speed of the low-pressure shaft significantly exceeds the corresponding speed ratio of the high-pressure shaft or the generators, respectively. Power transmission from the low-pressure shaft to the generators via a mechanical gear train, therefore, requires a multiple circuit system which is expensive in design and hardware and, in particular, incurs high extra weight, with reliability not being ensured due to the multiple circuitry arrangement.

In a broad aspect, the present invention, provides a two-shaft engine with high electric power capacity which, even at idle (low speed), is capable of supplying the high electric power required in aircraft operation.

It is a particular object of the present invention to provide solution to the above problems by an arrangement for a two-shaft engine in accordance with the features described below. Advantageous developments of the present invention will be apparent from the present description.

This invention, in its essence, provides for the use of the power of the low-pressure shaft for electric power generation by gearless power transmission from the low-pressure shaft to the high pressure shaft. Thus, an expensive multiple gear arrangement, as it is required for direct power generation from the low-pressure shaft operating in a broad speed range, can be dispensed with.

In accordance with a further feature of the present invention, power transmission from the low-pressure shaft, which operates in a lower speed range than the high-pressure shaft, is accomplished by an electromagnetic clutch whose clutch element on the side of the low-pressure shaft is connected to a power electronic system (engine control) for the generation of a frequency-controllable rotary field to enable the power of the low-pressure shaft, which rotates at lower speed than the high-pressure shaft, to be transmitted to the high-pressure shaft.

The clutch element on the side of the low-pressure shaft is a coil ring with several individual, annularly arranged coil sections, opposite ones of which are sequentially activated by the power electronic system (engine control) at a specific frequency, to create a frequency-controllable rotary field engaged by a magnet provided on the side of the high-pressure shaft.

In accordance with yet another feature of the present invention, a braking device is provided on the side of the low-pressure shaft to arrest the respective clutch element in a non-rotatable position, thereby enabling the high-pressure shaft to be run up at engine start by means of the rotary field without auxiliary equipment.

Figure 2:
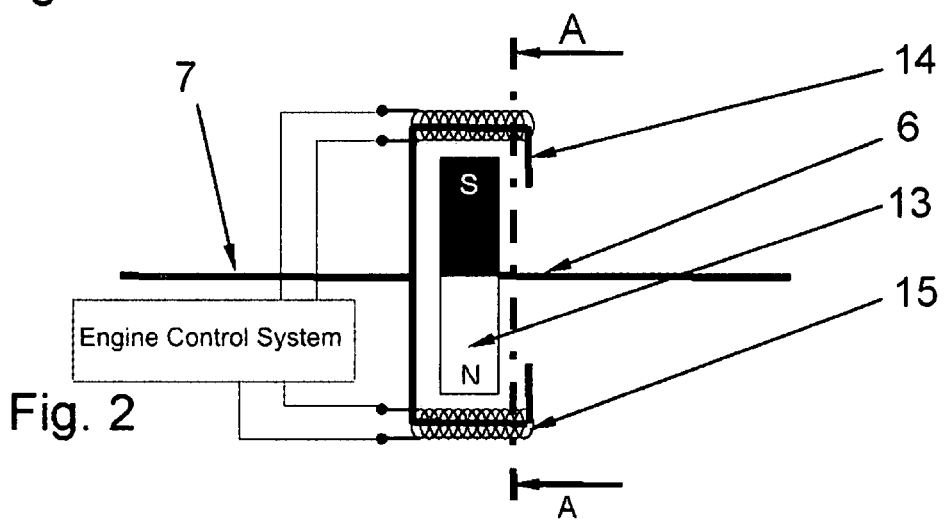
Figure 3:
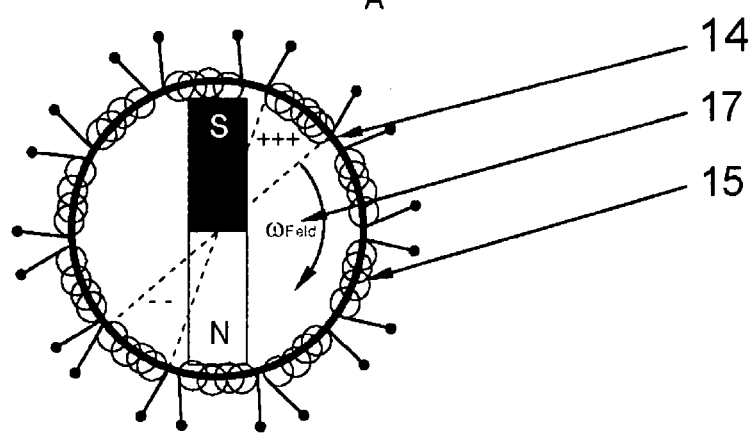

This invention is more fully described in light of the accompanying drawings showing a preferred embodiment. In the drawings:

FIG. 1 is a schematic representation of a two-shaft engine with two generators connected to the high-pressure shaft and one electromagnetic clutch to connect the low-pressure shaft to the high-pressure shaft, FIG. 2 is a lateral sectional view of the electromagnetic clutch in enlarged representation, and FIG. 3 is a sectional view of the electromagnetic clutch along line AA in FIG. 2.

The two-shaft engine shown in highly simplified form in FIG. 1 comprises, as major components, a fan 1, a high-pressure compressor 2, a combustion chamber 3, a high-pressure turbine 4 and a low-pressure turbine 5, as well as a hollow-type high-pressure shaft 6 through which a low-pressure shaft 7 is passed. The low-pressure shaft 7, which is connected to and driven by the low-pressure turbine 5, connects, at the engine inlet, to the fan 1, while the high-pressure shaft 6, which is driven by the high-pressure turbine 4, connects to the high-pressure compressor 2. The high-pressure shaft 6 is connected to two generators 9 via a gear train 8 to provide the electric power required for aircraft operation.

The low-pressure shaft 7 is connected to the high-pressure shaft 6 via an electromagnetic clutch 10 for non-contact torque transmission, actually via a low-pressure shaft gear train 11 and a high-pressure shaft gear train 12. The electromagnetic clutch 10 comprises a magnet 13 provided on the side of the high-pressure shaft and a coil ring 14 with a multitude of coil sections 15 provided on the side of the low-pressure shaft. Activation of the coil sections 15, or the frequency of the rotary field 17 generated by them, is controlled via the power electronic system of the engine (engine control).

Independently of the respective speed of the high-pressure shaft 6 and the low-pressure shaft 7 or the two clutch halves, respectively, power is transmittable as desired, i.e. controllable, from the low-pressure shaft 7 to the high-pressure shaft 6 by way of the rotary field of the coil ring 14 of the electromagnetic clutch 10, with the rotary field being activated and frequency-controlled by the power electronic system. Thus, the low-pressure shaft 7, which operates in a broad while lower speed range than the high-pressure shaft 6, can transmit power to the high-pressure shaft 6, enabling the latter to supply the electric power required by aircraft with increased electric power demand (multiple electrical applications) even during idle operation of the engine. The various speed ratios between the high-pressure shaft and the low-pressure shaft can be compensated by the—freely settable—rotary field frequency of the electromagnetic clutch 10 controlled by the power electronic system of the engine, thus enabling the power of the low pressure shaft 7 to be used for electric power generation by torque transmission to the high-pressure shaft 6.

A further feature of the connection between the low-pressure-shaft 7 and the high-pressure shaft 6 is the braking device 16 (arresting device) schematically shown in FIG. 1. The braking device locks/brakes the low-pressure shaft 7 or the coil ring 14, respectively, during engine start. The rotary field 17 generated by the now stationary coil sections 15 can then be used to accelerate the magnet 13 and thus, the high-pressure shaft 6, to a speed upon which the high-pressure shaft 6 is capable of autonomous further acceleration. Only then is the braking device 16 released and rotation of the low-pressure shaft 7 and of the clutch element 14 on the side of the low-pressure shaft enabled. Accordingly, the high-pressure shaft 6 is advantageously driven for start-up via the magnetic clutch 10—without auxiliary external drive—with the low-pressure shaft 7 or the clutch element (coil ring 14), respectively, being stationary. With the braking device 16, the low-pressure shaft starter system can be disengaged during this initial acceleration of the high-pressure shaft 6 so as not to overload the low-pressure starter system due to the reverse forces applied to the low-pressure shaft 7 when using the magnetic clutch 10 to accelerate the high-pressure shaft 6 as discussed above.

LIST OF REFERENCE NUMERALS

1 Fan
2 High-pressure compressor
3 Combustion chamber
4 High-pressure turbine
5 Low-pressure turbine
6 High-pressure shaft
7 Low-pressure shaft
8 Gear train
9 Generator
10 Electromagnetic clutch
11 Low-pressure shaft gear train
12 High-pressure shaft gear train
13 Magnet
14 Coil ring
15 Coil sections
16 Braking device
17 Rotary field

What is claimed is:

1. A two-shaft engine for aircraft with high electric power demand, comprising:
    a high-pressure shaft connected to at least one generator and driven by a high-pressure turbine,
    a low-pressure shaft driven by a low-pressure turbine,
    an electronic engine control system,
    an electromagnetic clutch connecting the low-pressure shaft to the high-pressure shaft for non-contact transmission of power from the low-pressure shaft to the high pressure shaft in a variable speed relationship, the electromagnetic clutch also connected to the engine control system, and
    wherein the engine control system controls the electromagnetic clutch to create a freely settable frequency-controllable rotary field in the electromagnetic clutch to compensate for significant speed ratio differences from idle to flight power conditions between the low-pressure shaft and the high-pressure shaft that allows the low-pressure shaft to transmit power to the high-pressure shaft even though the low-pressure shaft operates at a lower RPM than the high-pressure shaft.

2. A two-shaft engine in accordance with claim 1, wherein the electromagnetic clutch comprises:
    a coil ring connected to the low-pressure shaft and including several annularly arranged coil sections activated by the engine control system to control the frequency of the rotary field, and
    a magnet connected to the high-pressure shaft and engaging the rotary field of the coil ring.

3. A two-shaft engine in accordance with claim 2, and further comprising a gear train for connecting each side of the electromagnetic clutch to the low-pressure shaft and to the high-pressure shaft, respectively.

4. A two-shaft engine in accordance with claim 3, and further comprising:
    a braking device positioned on the low-pressure shaft side of the electromagnetic clutch for arresting the clutch element connected to the low-pressure shaft in a non-rotatable position, in order to accelerate the high-pressure shaft at engine start with the rotary field.

5. A two-shaft engine in accordance with claim 2, and further comprising:
    a braking device positioned on the low-pressure shaft side of the electromagnetic clutch for arresting the clutch element connected to the low-pressure shaft in a non-rotatable position, in order to accelerate the high-pressure shaft at engine start with the rotary field.

6. A two-shaft engine in accordance with claim 1, and further comprising:
    a braking device positioned on the low-pressure shaft side of the electromagnetic clutch for arresting the clutch element connected to the low-pressure shaft in a non-rotatable position, in order to accelerate the high-pressure shaft at engine start with the rotary field.

7. A two-shaft engine in accordance with claim 1, and further comprising a gear train for connecting each side of the electromagnetic clutch to the low-pressure shaft and to the high-pressure shaft, respectively.

8. A method for controlling a two-shaft engine for aircraft with high electric power demand, comprising:
    providing a high-pressure shaft connected to at least one generator and driven by a high-pressure turbine,
    providing a low-pressure shaft driven by a low-pressure turbine,
    providing an electronic engine control system,
    providing an electromagnetic clutch connecting the low-pressure shaft to the high-pressure shaft for non-contact transmission of power from the low-pressure shaft to the high pressure shaft in a variable speed relationship,
    connecting the electromagnetic clutch to the engine control system, and
    controlling the electromagnetic clutch with the engine control system to create a freely settable frequency-controllable rotary field in the electromagnetic clutch to compensate for significant speed ratio differences from idle to flight power conditions between the low-pressure shaft and the high-pressure shaft that allows the low-pressure shaft to transmit power to the high-pressure shaft even though the low-pressure shaft operates at a lower RPM than the high-pressure shaft.

9. The method of claim 8, and further comprising providing the electromagnetic clutch with:
    a coil ring connected to the low-pressure shaft and including several annularly arranged coil sections activated by the engine control system to control the frequency of the rotary field, and
    a magnet connected to the high-pressure shaft and engaging the rotary field of the coil ring.

10. The method of claim 9, and further comprising providing a gear train for connecting each side of the electromagnetic clutch to the low-pressure shaft and to the high-pressure shaft, respectively.

11. The method of claim 10, and further comprising:
    providing a braking device positioned on the low-pressure shaft side of the electromagnetic clutch for arresting the clutch element connected to the low-pressure shaft in a non-rotatable position, in order to accelerate the high-pressure shaft at engine start with the rotary field.

12. The method of claim 9, and further comprising:
providing a braking device positioned on the low-pressure shaft side of the electromagnetic clutch for arresting the clutch element connected to the low-pressure shaft in a non-rotatable position, in order to accelerate the high-pressure shaft at engine start with the rotary field.

13. The method of claim 8, and further comprising:
providing a braking device positioned on the low-pressure shaft side of the electromagnetic clutch for arresting the clutch element connected to the low-pressure shaft in a non-rotatable position, in order to accelerate the high-pressure shaft at engine start with the rotary field.

14. The method of claim 8, and further comprising providing a gear train for connecting each side of the electromagnetic clutch to the low-pressure shaft and to the high-pressure shaft, respectively.

* * * * *